(12) United States Patent
Jahnke

(10) Patent No.: US 7,010,722 B2
(45) Date of Patent: Mar. 7, 2006

(54) EMBEDDED SYMMETRIC MULTIPROCESSOR SYSTEM DEBUG

(75) Inventor: Steven R. Jahnke, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 523 days.

(21) Appl. No.: 10/256,507

(22) Filed: Sep. 27, 2002

(65) Prior Publication Data

US 2004/0064757 A1 Apr. 1, 2004

(51) Int. Cl.
*G06F 11/00* (2006.01)

(52) U.S. Cl. ............... 714/30; 714/727; 714/724; 324/763; 324/765

(58) Field of Classification Search ............ 714/30, 714/37, 724, 727; 712/227; 710/100
See application file for complete search history.

(56) References Cited

U.S. PATENT DOCUMENTS

| | | | | |
|---|---|---|---|---|
| 5,617,420 | A * | 4/1997 | Whetsel | 370/402 |
| 5,898,704 | A * | 4/1999 | Kawano | 714/727 |
| 6,065,078 | A * | 5/2000 | Falik et al. | 710/100 |
| 6,073,254 | A * | 6/2000 | Whetsel | 714/30 |
| 6,311,302 | B1 * | 10/2001 | Cassetti et al. | 714/727 |
| 6,324,662 | B1 * | 11/2001 | Haroun et al. | 714/724 |
| 6,334,198 | B1 * | 12/2001 | Adusumilli et al. | 714/727 |
| 6,408,413 | B1 * | 6/2002 | Whetsel | 714/727 |
| 6,425,101 | B1 * | 7/2002 | Garreau | 714/727 |
| 6,560,734 | B1 * | 5/2003 | Whetsel | 714/724 |
| 6,571,360 | B1 * | 5/2003 | Drogichen et al. | 714/44 |
| 6,643,796 | B1 * | 11/2003 | Floyd et al. | 714/10 |
| 6,675,284 | B1 * | 1/2004 | Warren | 712/38 |
| 6,686,759 | B1 * | 2/2004 | Swamy | 324/765 |
| 6,691,289 | B1 * | 2/2004 | Chae et al. | 716/4 |
| 6,825,683 | B1 * | 11/2004 | Berndt et al. | 324/763 |
| 6,829,730 | B1 * | 12/2004 | Nadeau-Dostie et al. | 714/30 |
| 2003/0046625 | A1 * | 3/2003 | Menon et al. | 714/727 |
| 2003/0079166 | A1 * | 4/2003 | Vermeulen et al. | 714/727 |

* cited by examiner

*Primary Examiner*—Robert Beausoliel
*Assistant Examiner*—Philip Guyton
(74) *Attorney, Agent, or Firm*—Robert D. Marshall, Jr.; W. James Brady, III; Frederick J. Telecky, Jr.

(57) ABSTRACT

A test signal multiplexer receives supplies external test signals to a selected debug master central processing unit in a symmetrical multiprocessor system and debug slave signals to debug slave central processing units. An executive master test access port controller responds to the external test signals and controls the test signal multiplexer. A control register loadable via the executive master test access port stores the debug slave signals. A test data output multiplexer connects the test data output line of the selected debug master central processor unit to an external test data output line. The external test signals includes a debug state signal supplied to each central processing unit. This selects either a normal mode or a debug mode at each central processor unit.

6 Claims, 2 Drawing Sheets

EMBEDDED SYMMETRIC MULTIPROCESSOR SYSTEM DEBUG

TECHNICAL FIELD OF THE INVENTION

The technical field of this invention is debugging in embedded symmetrical multiproccessing.

BACKGROUND OF THE INVENTION

Most multiprocessor systems have two or more central processing units that are not completely identical, but instead have a degree of individual special features and functions. The tighter coupling between the multiprocessors integrated on a single chip allows for a more efficient passing of data than for similar multiprocessors implemented at the board level. Each central processing unit may have a different memory map, different peripheral set and perhaps even a different instruction set. In applications that have very distinct boundaries, such as a wireless telephone, this method of extracting optimum performance is crucial.

In this conventional embedded multiprocessor system, as a general rule, while the multiple central processing units are integrated, each is generally running its own program. In a symmetric embedded multiprocessor system, by contrast, multiple central processing units are running the same program, albeit different threads of that same program. The threads could be run on any one of the central processing units at any given time, as opposed to the conventional embedded multiprocessor systems in which each central processing unit will normally be running its own program.

As a result, the coupling of hardware resources such as memory and peripherals are not simply tighter in the symmetric embedded multiprocessor case, but these resources are accessed differently and are of an architectural structure fundamentally different from the conventional embedded multiprocessor case. Currently, embedded central processing units share a great deal of hardware, but such hardware relies strongly on the software to provide protection from access request collisions. In the symmetric case, all hardware is not only shared, but the hardware architecture is such that it is invisible to the software and requires only very minor support in the operating system. This support differs from the conventional case only in the boot routines and in the manner in which a thread is launched versus a single central processing unit case. Consider the effect this has on software debugging and the software debugging tools.

In the case of conventional multiprocessors, debugging works well when the programs are running independently. By contrast this debugging would be complicated when the processing involves interaction operations such as use of a shared variable or shared resources. In these situations one central processing unit would have no information what the other central processing unit was accessing or changing. In a symmetric multiprocessor all central processing unit operations are interaction operations and there would be obvious difficulties.

As a result there is a need for direct testing of the software thread interactions. This testing becomes a critical part of the verification on the part of the user that the program is working with these thread interactions fully active.

Though the software debugging tools use the same test access port controller that the hardware debuggers use, the test access port controller is used to facilitate the scanning in of special debug instructions directly into the central processing unit during the interval between the times the central processing unit is running a real user program. These instructions set breakpoints, watch points on variables and other parameters of importance. They are inserted and acknowledged behind the scenes of the program being debugged. Thus the user is never required to program a debug instruction. These instructions are inserted by the debug tools.

The starting point would be a single central processing unit case, and taking how the tools work in the single central processing unit case, and extending it to a symmetric multiprocessor case. A great deal of engineering has already been done on debug methods for conventional non-symmetric multiprocessors. For symmetric multiprocessors, however, there is an additional requirement to ensure variables do not change without the user being aware of those changes since the all data and status information is shared.

SUMMARY OF THE INVENTION

It is desirable to define an architecture that offers the modularity and flexibility of a multiprocessor system, the reuse, the lower development costs and scalability advantages of a single central processing unit system. This embedded symmetric multiprocessor system has been developed to reach these goals.

A This invention is debug system for symmetrical multiprocessor systems including plural central processor units. Each central processor unit includes a test access port. A test signal multiplexer receives external test signals and debug slave signals. The test signal multiplexer couples the external test signals to the test access port of a single selected debug master central processor unit and debug slave signals to other non-selected slave central processor units. An executive master test access port controller receives the external test signals and supplies them to the multiplexer. The executive master test access port controller responds to the external test signals and supplies a select signal to the test signal multiplexer to specify the single selected debug master central processing unit. The external test signals include a test clock supplied to all central processor units. A control register loadable via the executive master test access port stores debug slave signals for the debug slave central processor units. These debug slave signals causes the non-selected debug slave central processing units to enter a halt state.

The test access port of each central processor unit further includes a test data output line. A test data output multiplexer receives the test data output line from each central processor unit and connects the test data output line of the selected debug master central processor unit to an external test data output line. This test data output multiplexer is controlled by the executive master test access port controller.

The external test signals includes a debug state signal supplied to each central processing unit. This selects either a normal mode or a debug mode at each central processor unit.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
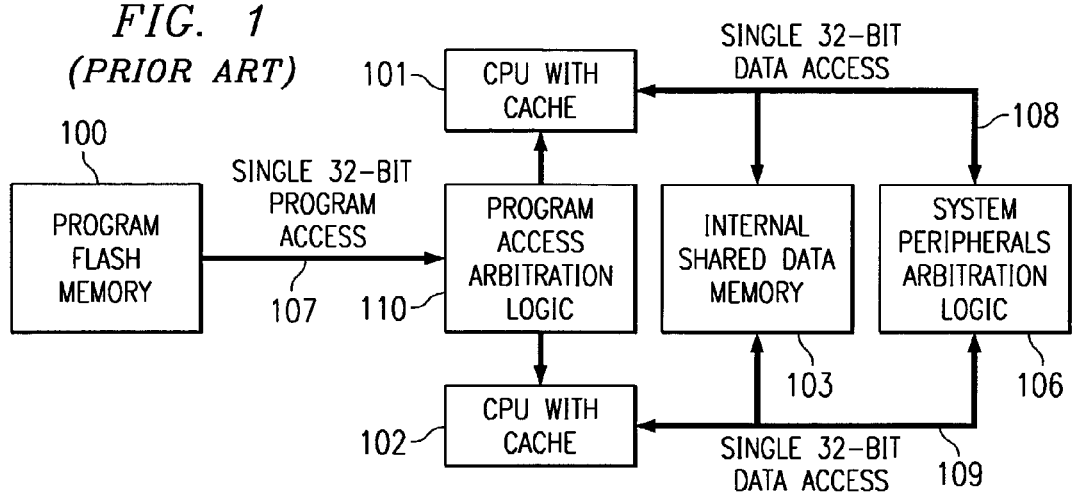
FIG. 1 illustrates an embedded symmetric multiprocessor system (Prior Art)

The embedded symmetric multiprocessor system (ESMP) architecture is illustrated in FIG. 1. A single flash memory device 100 stores a single program stream. Both central processing units 101 and 102 receive their instructions from program FLASH memory 100 via single 32-bit program access bus 107 and program access arbitration logic block 110. Both central processing units 101 and 102 receive their data from internal shared data memory 103 via respective single 32-bit data access busses 108 and 109. when an instruction cache miss occurs, arbitration logic 110 will determine which central processing unit has priority access to flash memory 100. All system resources are shared and visible to central processing units 101 and 102. Both central processing units 101 and 102 run the same instruction set and have identical organizations. Similarly, system peripherals and arbitration logic 106 is shared between central processing units 101 and 102.

Figure 2:
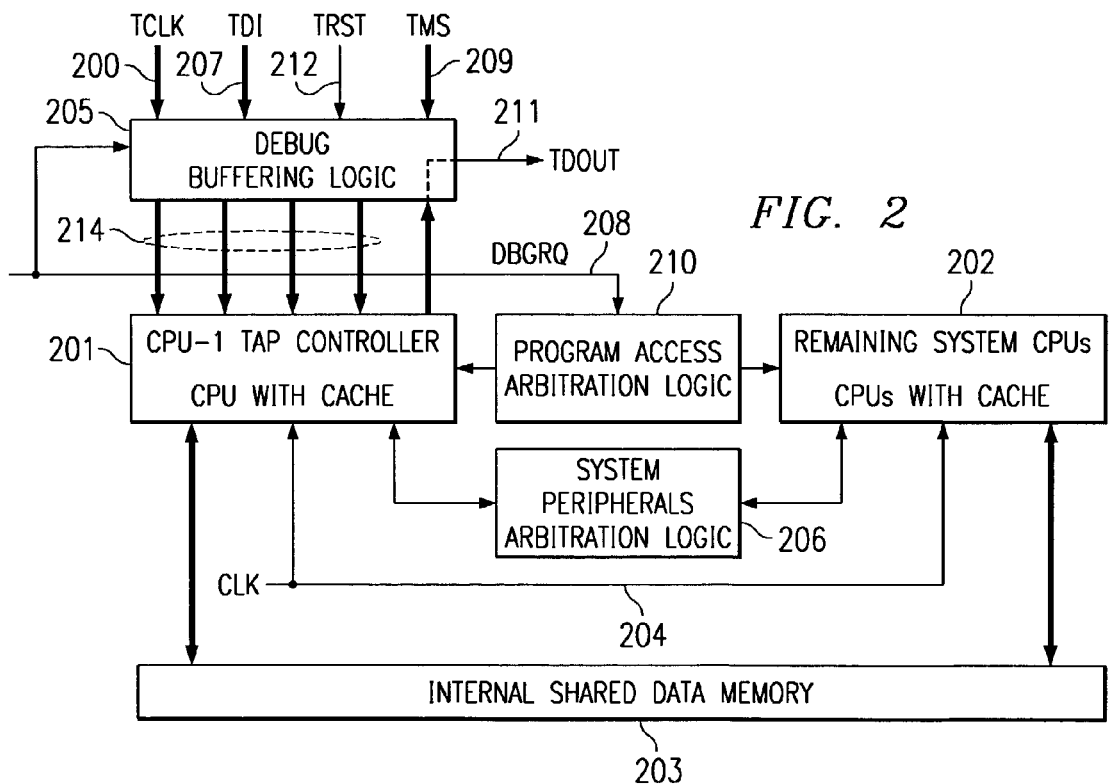
FIG. 2 illustrates a conventional symmetric multiprocessor debug system using conventional toolset having a fixed master debug central processing unit.

It is desirable to debug software on an embedded symmetrical multiprocessor system as simply as on a single-central processing unit system. It is desirable to reuse existing single-central processing unit tools to reduce development costs. Because of the dependence of shared variables among different processes, when a central processing unit enters a debug state, the entire system must suspend. If not, data values represented in a memory window may chance during debug. FIG. 2 illustrates a simplified debug hardware architecture for a multiprocessor where debug is controlled by a single central processing unit. Test access port (TAP) control signals are listed in Table 1.

TABLE 1

| Signal Name | Reference Number | Function |
| --- | --- | --- |
| TCLK | 200 | Test Clock |
| TDIN | 207 | Test Data Input serial input data stream |
| TMS | 209 | Test Mode Select input |
| TDOUT | 211 | Test Data Output serial output data stream |
| TRST | 212 | Test Reset for TAP hardware |

FIG. 2 illustrates central processing units 201 and 202, internal shared data RAM 203, system peripheral arbitration logic 206 and program access arbitration logic 210. These parts are similar to correspondingly number parts illustrated in FIG. 1. FIG. 2 further illustrates debug buffering logic 205. Test signals are comprised of the standard test access port control signals listed plus debug request signal (DBGRQ) 208. This debug architecture requires no changes to existing tools or production test methods. All applications can be debugged in this fashion but with only limited visibility of the low-level software operations, such as an operating system or boot kernel operations.

The full complement of test access port control signals enter the test access port controller of central processing unit 201 through paths 214. Output serial data exits the test access port controller of central processing unit 201 via path 211. Program access arbitration logic block 210 further provides a means to effectively establish conflict free testing of the separate central processing units 201 and 202.

In the model of FIG. 2, when the system enters the debug state, all central processing units enter debug mode at the same time. This is important, since all elements of the entire symmetrical multiprocessing system must be suspended at the same time. However, only the debug master, central processing unit 201 in FIG. 2, will be clocked with the test clock TCLK 200. Through the master debug central processing unit 201, the system memory address space can be viewed and changed in a debug window in a normal fashion. This is so, because all central processing units have complete access to all memory and peripherals. The master debug central processing unit 201 can view variables that are used by the other central processing units 202 since it has access the memory used by all central processing units. Since a single instruction stream is executed, the master debug central processing unit 201 can set breakpoints and watch-points on addresses that are used by processes running on a different central processing unit. Even though the master debug central processing unit 201 will never run the code associated with the breakpoint, it can still set the code since it has access to its memory. The master debug central processing unit 201 can view and debug the state of the system, such as memory and peripherals. If the internals, such as registers and co-processors, of another central processing unit need to be debugged, an additional method to select the debug master central processing unit is required.

Debug request signal 208 allows input of a debug request and is not part of the test access port hardware. Debug request signal 208 is required by the debug hardware to place the other central processing unit 202 into debug mode. Debug buffering logic 205 usually includes a test access port controller, plus some additional logic within the program access arbitration logic 210 to insure the central processing unit is placed into debug mode on the exact cycle of interest. A test access port controller cannot do this alone. This debug hardware is included in the same region of the integrated circuit as the master debug central processing unit, but is outside of the central core of the central processing unit. The debug hardware may be considered as part of the fixed master debug central processing unit but not a part of the arithmetic logic unit belonging to the debug master central processing unit. Debug request signal 208 is not generated as a result of action initiated by the external debug tools software. Instead a test access port controller signal generator external to FIG. 2 generates debug request signal 208 as an input to debug buffering logic 205. Debug buffering logic 205 in turn drives the master debug central processing unit 201.

Debug buffering logic 205 sets break points, watch-points and other pertinent status information while all central processing units, master and slaves, are in debug mode. In order to do this, the master debug central processing unit 201 must execute the appropriate instructions, usually loads and stores to memory where the debug symbols are kept. Once the setting of breakpoints are done, the user initiates a 'run to breakpoint' command. All central processing units run in the system as in normal operation, that is the non-debug mode. The only time that central processing units 202 not debug master central processing units are frozen is when these central processing units enter into debug state. This only occurs when the debug tools are active within the system. Once the tools are finished setting up the system as input from the user tools, the system then leaves debug state and executes code normally. When the system halts, such as when a breakpoint is reached, the system re-enters debug mode. this freezes the system, but a central processing unit in a single central processing unit system must still run the debug instruction from the test acess port controller to update the debug windows on the overall system variables or memory content that have changed. Debug master central processing unit 201 in an embedded symmetrical multiprocessor system performs this task. Other central processing unit 202 must not operate during this time. Otherwise the system could change some state over which debug master central processing unit 201 has no control.

It is important to define clearly here the concept of master debug central processing unit and slave debug central processing unit. Basically, only one central processing unit may be active when the test access port tools are inserting the special debug instructions and this is the master debug central processing unit. The reason is that if other central processing units are also active, and may be scanning in debug instructions, changing a variable, or re-entering a register value, for example, independently of the debug host software. The debug host software resides on a computer that displays the central processing unit state, memory windows, and other debugging related information allowing the engineer to observe all the active processes in progress.

The master-slave concept is necessary to maintain the integrity of the data being displayed by the host computer software. Since all variables and peripherals are shared in a symmetric multiprocessor system, only one central processing unit can be allowed to change the state of the system during the scanning in of debug instructions. The other central processing units must be inhibited from changing the state of the system. The user created application code will still be running normally.

Figure 3:
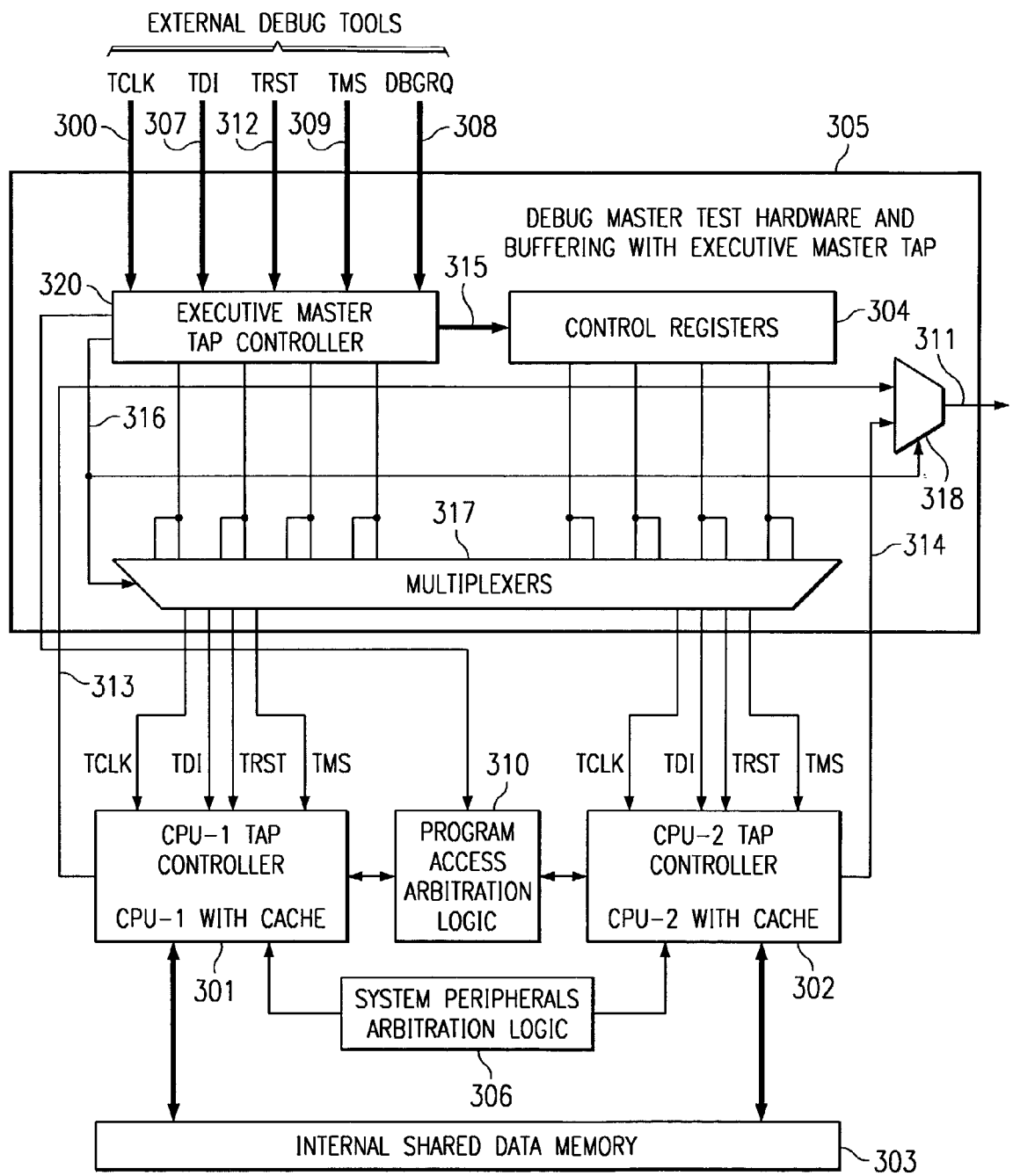
FIG. 3 illustrates a high-level block diagram of the enhanced embedded symmetric multiprocessor debug system of this invention.

FIG. 3 illustrates the debug method of this invention. FIG. 3 illustrates central processing units 301 and 302, internal shared data RAM 303, system peripheral arbitration logic 306 and program access arbitration logic 310. These parts are similar to correspondingly number parts illustrated in FIGS. 1 and 2. This debug method includes three central features.

1. A means for establishing a debug mode and selecting one of a number of possible central processing units which make up an embedded symmetric multiprocessor system as debug master. The other central processing units are designated as debug slaves. This is accomplished through user input to control registers 304 via the executive master test access port controller (EMTAP) 320. Executive master controller 320 receives the external dedug signals TCLK 300, TDI 307, DBGRQ 308, TMS 309 and TRST 312.

2. An added executive master test access port controller receives the test access port signals from a single source. This executive master test access port controller in turn drives a test access port controller resident on the master debug central processing unit. The executive master test access port controller 320 reads the scan chain serial inputs FDI 307. Executive master test access port controller 320 may receive a command to change the debug master. The executive master test access port 320 allows the test access port signals to pass through to the new debug master central processing unit, while holding all other test access port signals to an off state for the non-debug master central processing units.

3. The debug master designated may be dynamically changed to another central processing unit. The executive test access port controller also coordinates all signal flow to and from the central processing units of the embedded symmetrical multiprocessor in the debug mode.

Control registers 304 are loaded through the executive master test access port using the same input serial stream through TDI 307. Executive master test access port controller 320 directs this data through path 315. The control registers 304 provide to the multiplexers 317 a set of logic levels for the slave central processing units. The executive master test access port 320 provides select control signal 316 to multiplexer 317. Multiplexer 317 directs the test access port signals to the master debug central processing unit and appropriate logic levels to inputs of the slave central processing units. Output multiplexer 318 receives serial output data from central processing unit 301 through path 313 or from central processing unit 302 through path 314 and provides test module serial output data at node 311. Output multiplexer 318 is also controlled by select control signal 316 from executive master test access port controller 320.

During the debugging process the internal states of only the master debug central processing unit are observed. So there must be a means to determine which central processing unit is designated as master. The crucial second part of the invention relates to this means of designating a central processing unit as master and being able to verify that a central processing unit is master. From the system viewpoint, it does not matter which central processing unit is master since all central processing units have access to all system resources such as memory and peripherals. On the other hand if the debugging operation requires tracking registers contents or co-processor operations, the ability to select an individual central processing unit as master is necessary.

This process may be achieved by having another test access port controller at the system level that will select the master central processing unit based on the user input in the debug host software. This system test access port controller then passes through the test access port signals to the chosen master central processing unit. This involves holding off the other test access port signals to the slave central processing units so that other individual test access port controller does not activate during a debugging session. These other individual test access port controllers are simply held in a halt mode.

The enhanced embedded symmetrical multiprocessor debug system of this invention is illustrated in FIG. 3. Block 305 contains the full complement of debug master test hardware, executive master test access port, and buffering with logic added that decides based on the input from software support which central processing unit is to be the debug master. All central processing units still enter debug mode and slave debug central processing units will simply suspend. Constrained in this manner the system state cannot be changed by the slaves. The crucial hardware element within block 305 is an executive master test access port controller 320 that acts upon the detection of a pre-determined bit stream received at input TDI 307 from the debug tools. This bit stream will indicate that the user wishes to put the system into debug mode and which central processing unit is to be the debug master. The user then sets breakpoints and the test system is configured to view central processing unit internal states on whichever central processing unit is desired.

This model allows the user to program through the software support interface 315 a register within control registers 304 that selects a master central processing unit, either central processing unit 301 or 302. Then the internal states of the selected central processing unit can be examined. Only minor changes to the conventional debug tool suite are required. The present invention uses conventional debug tool and software with a combination of enhanced debug hardware and slight additional software support to fully debug an embedded symmetric multiprocessor system. The simple technique outlined in FIG. 2 while acceptable for system considerations, is suitable only for a single central processing unit since the debug master is fixed, for a single central processing unit, because only the debug hardware internal states and central processing unit registers may be examined.

The present invention provides additional debug logic and a master test access port controller outside of the central processing unit cores that allows for configuration of the debug master test hardware 305 so that the central processing unit internal states of all central processing unit cores in the system may be examined closely. This invention also supports a complete debug view of the entire system, with support for setting of breakpoints in other central processing units, modifying code and data as has been done in debugging more elementary systems.

The present invention creates master debug test hardware that contains the additional executive master test access port controller. This test access port controller then can read the test access port signals from the debug tools. The hardware within block 305 controls which central processing unit is the debug master. Each central processing unit may still retain its own test access port controller, just as in the single central processing unit case, so that the tools can access the send/receive the information as required. No change in the central processing unit test access port controller is required, nor is there any need to modify the software that supports it from the debug host computer side.

The debug host software contains an additional function that allows the user to designate which central processing unit is the debug master. Once the central processing unit is designated, the debug hardware 305 will send out a special test access port control packet, in the form of a bit stream, that only executive master test access port controller 320 will act upon. This system test access port controller will then designate which central processing unit is the debug master. The test access port controller does this by passing the full complement of test access port signals (TCLK, TDO, TDI, TMS, TRST) to that designated central processing unit via multiplexer 317. The remaining central processing units receive only TCLK so that they may still execute code normally, and do not need to do anything else. The debug request signal 308 is sent to all central processing units normally so that all central processing units will enter the debug state at the simultaneously.

What is claimed is:

1. A debug system for symmetrical multiprocessor systems including plural central processor units, each central processor unit including a test access port, said debug system comprising:
   a first test signal multiplexer receiving external test input signals and debug slave signals, said first test signal multiplexer directly coupling external test input signals to input lines of the test access port of a single user selected debug master central processor unit and coupling debug slave signals to at least one non-selected debug slave central processor unit thereby causing said at least one non-selected debug slave central processor unit to operate in a slave mode; and
   a second test signal multiplexer having a plurality of inputs, each input directly coupled to an output line of the test access port of a corresponding one of said plural central processing units, and having an output supplying an external test output signal, said second test signal multiplexer coupling said output line of said single selected debug master central processor to output.

2. The debug system of claim 1 further comprising:
   an executive master test access port controller receiving external test signals and supplying said external test signals to said first test signal multiplexer and said second test signal multiplexer, said executive master test access port controller responsive to said external test signals for supplying a select signal to said first test signal multiplexer and to said second test signal multiplexer to specify said user single selected debug master central processing unit.

3. The debug system of claim 2 wherein:
   said external test signals include a test clock; and
   said first test signal multiplexer supplies said test clock to all central processor units.

4. The debug system of claim 2 comprising further:
   a control register connected to the executive master test access port controller, said control register receiving and storing debug slave signals from said executive master test access port controller and supplying said debug slave signals to said first test signal multiplexer; and
   said first test signal multiplexer supplies said debug slave signals to said at least one non-selected debug slave central processor unit.

5. The debug system of claim 4 wherein:
   said debug slave signals supplied to said at least one non-selected debug slave central processor unit causes said at least one non-selected debug slave central processing unit to enter a halt state.

6. The debug system of claim 1 wherein:
   an executive master test access port controller receiving external test signals, said external test signals including a debug state signal supplied to each central processing unit for selecting alternately a normal mode or a debug mode at each central processor unit.

* * * * *